July 23, 1968

D. MILLER ET AL 3,394,079

METHOD AND APPARATUS FOR OPERATING AND
REGENERATING ION EXCHANGERS

Filed Oct. 13, 1967

INVENTOR
DURANDO MILLER
RALPH C ADAMS

BY *Theodore B Roessel*

ATTORNEY

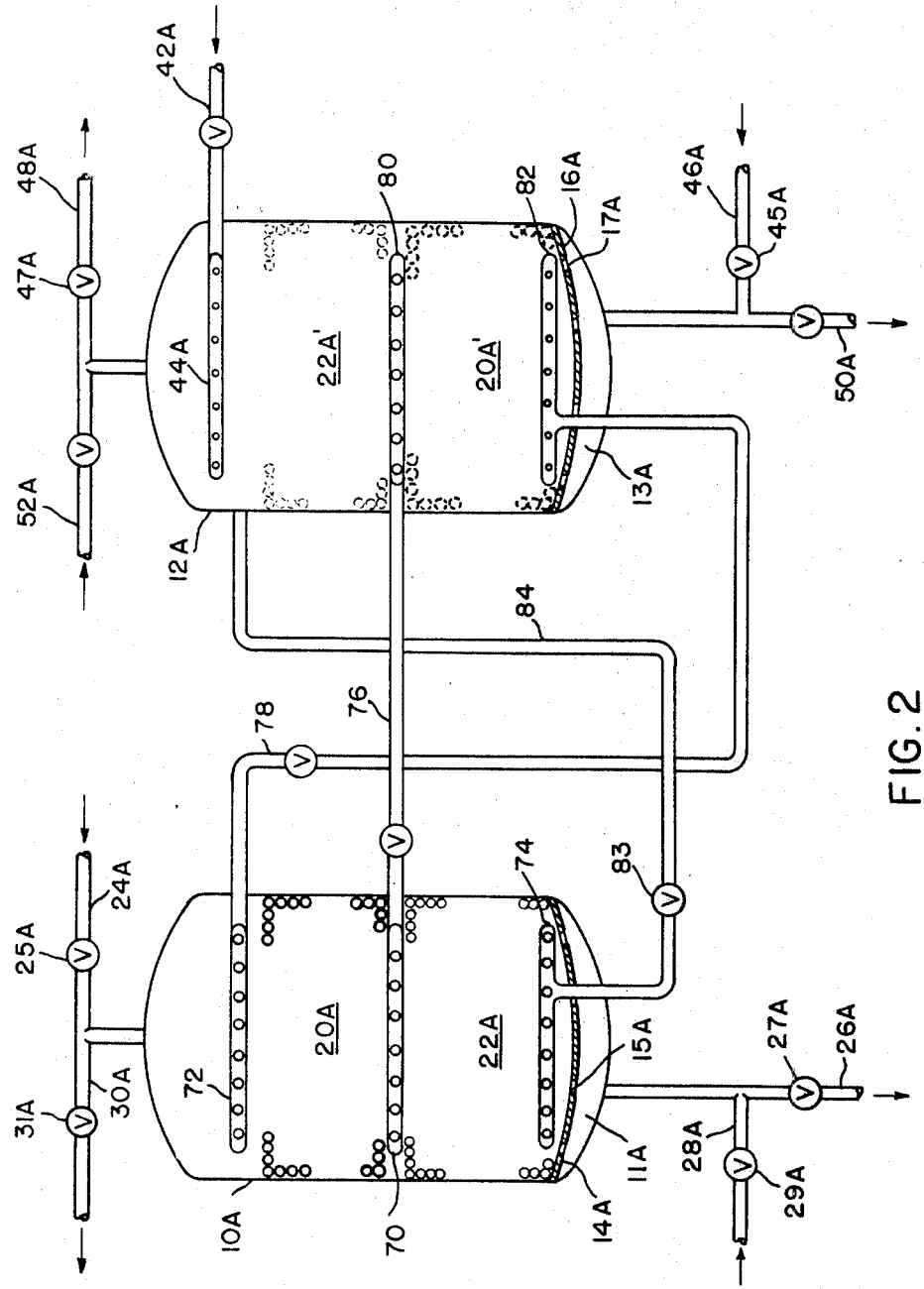

3,394,079
METHOD AND APPARATUS FOR OPERATING AND REGENERATING ION EXCHANGERS
Durando Miller, Mount Kisco, N.Y., and Ralph C. Adams, Midland Park, N.J., assignors to Ritter Pfaudler Corporation, Rochester, N.Y., a corporation of New York
Filed Oct. 13, 1967, Ser. No. 675,239
10 Claims. (Cl. 210—33)

ABSTRACT OF THE DISCLOSURE

An ion exchange apparatus which uses both weakly basic and strongly basic anion exchange resins or both weakly acidic and strongly acidic cation exchange resins in the same service vessel wherein the weak and strong resins have different densities and are arranged in layers in the service vessel, the layer of weak resin being located above the layer of strong resin. With this arrangement the fluid being treated can flow downwardly in the service vessel through the weak and then through the strong resin. Regeneration occurs in a separate vessel, the exhausted layers of weak and strong resin from the service vessel being arranged in the regenerator in reverse order; that is, the strong resin on top of the weak resin so that the regenerant can flow downwardly in the regenerator first through the exhausted strong resin and then through the exhausted weak resin. After regeneration, the weak and strong resins are returned to their original positions in the service vessel.

---

Figure 1:
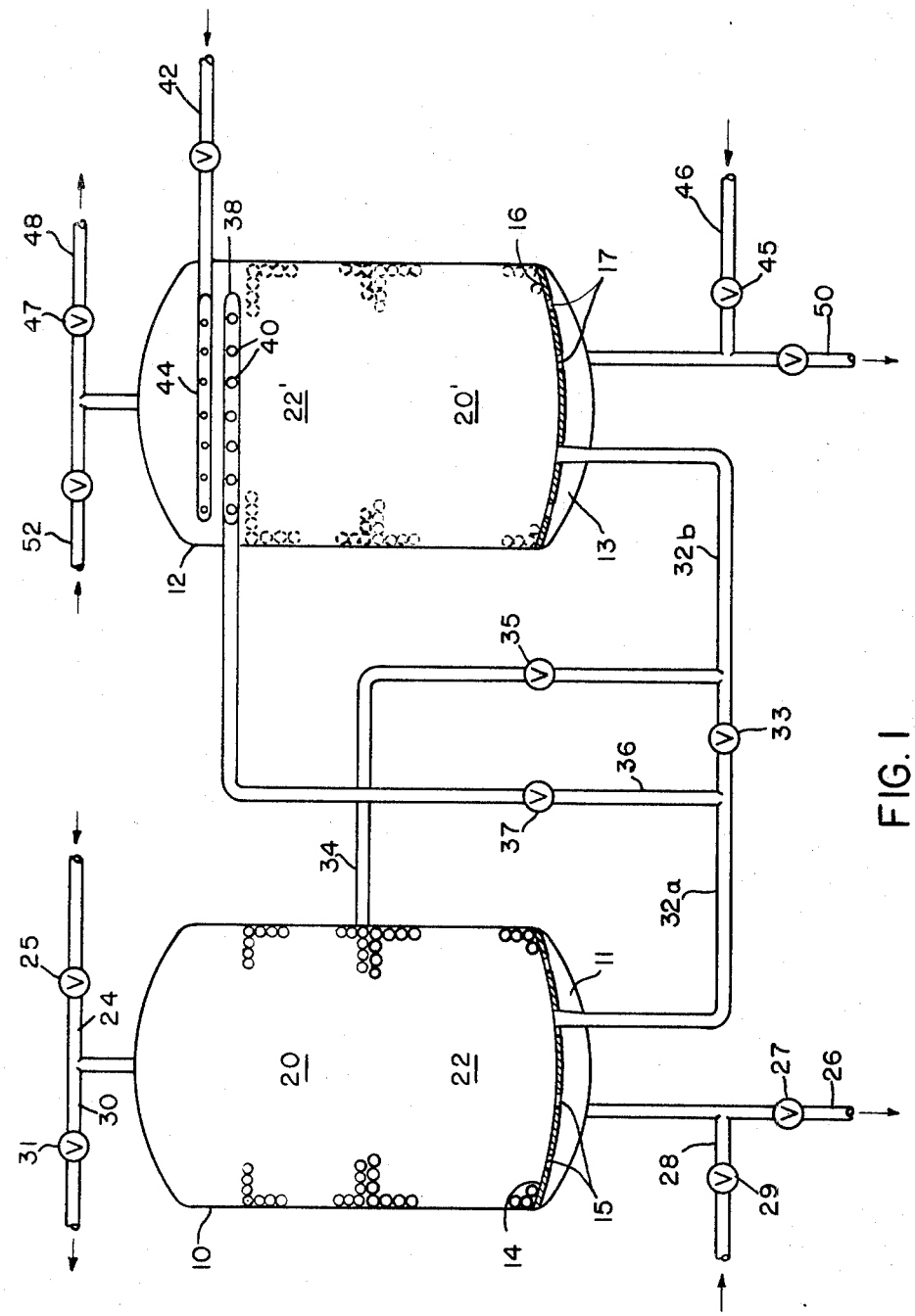

The present invention relates to a mehod and apparatus of operating and regenerating ion exchangers and more specifically to the downflow operation and regeneration of ion exchangers which employ both weak and strong cation or anion exchange resins in the same service vessel.

Background of the invention

In ion exchange practice, it is frequently desirable to employ two or more ion exchange resins whose characteristics complement each other; for example, a weakly acidic cation exchanger and a strongly acidic cation exchanger or a weakly basic anion exchanger and a strongly basic anion exchanger. It is common practice in the art to use two or more service vessels each containing one of these resins. The vessel containing the weak resin is usually located upstream and in series with the vessel containing strong resin so that the fluid being treated will contact the weak resin first and then the strong resin. The benefits of operating ion exchange apparatus in this manner are well known in the art and therefore will not be discussed in detail. It is sufficient to say merely that such a procedure provides an efficient method of operating ion exchange apparatus. Regeneration of the weak and strong ion exchange resins in prior art apparatus is accomplished by counterflowing a regenerant first through the strong resin and then through the weak resin. Again, the benefits of this method of regeneration are well known in the art and will not be discussed. For purposes of the present invention, it is sufficient to say that this sequence of regeneration provides the most efficient method of regenerating weak and strong ion exchange resins. It is also possible to use a weak and a strong resin in a single service vessel with the weak resin being located above the strong resin. With this arrangement the efficient regeneration sequence requires that the regenerant flow upwardly in the service vessel in a counterflow manner first through the layer of strong and then through the layer of weak resin. This counterflow regeneration, however, poses several problems of hydraulic and mechanical design which detracts from the efficiency of the regeneration sequence. For example, flowing the regenerant upwardly through the service vessel tends to fluidize the resin beds, destroying the distinctness of each resin layer. It would be possible to use a screen or other similar mechanical device in the service vessel at the weak-strong resin interface to prevent them from mixing during counterflow regeneration, but this would be expensive and furthermore a confined bed cannot be readily backwashed for cleaning or removal of excessively fine resin particles or of suspended matter which have been filtered from the fluid being treated by the resin beds.

Summary of the invention

In the present invention, resins having complementing characteristics and differing specific gravities are employed in a single service vessel. The resins are arranged in layers or beds with the weaker resin located above the stronger resin. The lighter resin may be on top, but the process is not materially affected if the heavier resin were on top and both schemes are described hereinbelow.

Regeneration of the resin beds can occur whenever certain preconditions are met as for example, the detection of ions in the effluent from the service vessel or simply on a time basis. When these conditions are met, the flow of the fluid being treated is stopped and the resins transferred to a regenerating vessel. The transfer is accomplished in such a fashion that substantially the entire upper layer or bed of weak resin is traneferred from the service vesel to the regenerating vessel first so as to form the bottom layer of resin in the regenerating vessel. Afterwards, the layer of strong resin remaining in the service vessel is transferred to the regenerating vessel to a position on top of the layer of weak resin. Regeneration of the strong and weak resin in the regenerating vessel is then accomplished by introducing a regenerant in a downflow manner through the layers of resins permitting the stronger and substantially excess volume of regenerant to come first into contact with the strong resin and subsequently into contact with the weaker resin. As stated hereinabove, this regeneration sequence permits a high degree of efficiency in regenerating exhausted weak and strong ion exchange resins. After regeneration and rinsing, both resins are returned to and located in the service vessel in their original order; that is, with the layer of weak resin located above the layer of strong resin.

Objects of the invention

It is an object of our invention to provide a method and apparatus for the downflow operation and regeneration of ion exchangers.

Another object of our invention is to provide a method and apparatus for operating and regenerating ion exchangers in which two or more ion exchange resins having complementing characteristics are used in a single service vessel.

A further object of our invention is to provide a method for operating and regenerating ion exchangers in which the service cycle is accomplished by downflowing the fluid to be treated first through a bed of weak resin and then through a bed of strong resin and in which the regeneration cycle is accomplished by downflowing a regenerant first through the exhausted strong resin and then through the exhausted weak resin.

These and other objects, advantages and characterizing features of our invention will become more apparent upon consideration of the following detailed description thereof in conjunction with the accompanying drawings depicting the same in which:

FIGURE 1 is a schematic diagram of the apparatus for practicing the method of our invention wherein the upper layer of weak resin is lighter than the lower layer of strong resin; and FIGURE 2 is a view similar to FIGURE 1 only showing an embodiment of our invention wherein the upper layer of weak resin is heavier than the lower layer of strong resin.

Referring now to the drawings, FIGURE 1 shows the apparatus to include a service vessel 10 and a regenerating vessel 12. Each vessel has a false bottom 14 and 16 respectively defining underdrain portions 11 and 13 and each false bottom is provided with a plurality of screened openings 15 and 17 for purposes set out hereinbelow.

Arranged within service vessel 10 are two layers or beds 20 and 22 of ion exchange resin. Beds 20 and 22 are indicated by resin beads at their periphery and the internal blank space, but it should be appreciated that the resin beads fill the entire internal blank space. The resin making up beds 20 and 22 should have similar and complementing characteristics; for example, both beds can be cation exchange resins with bed 20 being a weakly acidic cation exchanger and bed 22 being a strongly acidic cation exchanger. In the alternative, both beds 20 and 22 can be anion exchange resins with bed 20 being a weakly basic anion exchanger and bed 22 being a strongly basic anion exchanger. For purposes of the embodiment shown in FIGURE 1, it should also be noted that the upper bed 20 has a specific gravity which is less than the specific gravity of the lower bed 22, the dark shading of bed 22 indicating that it is composed of denser material than the unshaded bed 20. In other embodiments, however, the reverse may be true; that is, the upper bed may have a specific gravity which is greater than the lower bed.

Service vessel 10 includes a top located inlet 24 for the fluid to be treated and a bottom located outlet 26 for treated fluid. The service vessel also has a bottom located inlet 28 and a top located outlet 30 for backwashing and fluidizing the resin beds. A valved resin transfer pipe comprising the two connected pipes 32a and 32b extends between the false bottom 14 of service vessel 10 and the false bottom 16 of regenerating vessel 12 to form a conduit interconnecting the lower portions of the vessels above underdrains 11 and 13. Another valved resin transfer pipe 34 extends from service vessel 10 just above the area of the weak-strong resin interface, and joins with pipe 32b. A third valved resin transfer pipe 36 joins with pipe 32a, extends into the upper portion of the regenerating vessel and connects with a resin distributor grid 38. Grid 38 has a plurality of openings 40 therein for discharging resin beads evenly over the cross-sectional area of the regenerator. A fourth valved pipe 42, which extends into the upper portion of regenerating vessel 12 and is connected to a distributor grid 44, is provided for introducing a regenerant into the regenerating vessel.

In the normal service cycle, the fluid to be treated, such as water, enters service vessel 10 through inlet 24, flows downwardly first through the weak and then strong ion exchange resin and leaves the service vessel as treated water through outlet 26. The false bottom 14 and screened openings 15 therein prevent the water from washing resin particles into underdrain 11 and outlet 26. When it becomes necessary to regenerate resin beds 20 and 22, the flow of water through vessel 10 is first stopped by closing valves 25 and 27, in inlet 24 and outlet 26 respectively. The exhausted resins are then transferred to regenerating vessel 12 in a manner set forth hereinbelow.

As stated above, it is well known in the art that regeneration proceeds most efficiently when the regenerant passes first through the exhausted strong ion exchange resin and then through the exhausted weak ion exchange resin. Therefore, resin beds 20 and 22 must be transferred to and arranged in the regenerator in a manner which places the bed of exhausted weak resin 20 in the lower portion of the regenerator and the bed of exhausted strong resin 22 in the upper portion of the regenerator. The transfer of resin can be accomplished by using an upward flow of water to fluidize the volume of resin located immediately adjacent the inlets to the transfer pipes so that the resin can be worked into and through these pipes from one vessel to another.

In this respect, the transfer of weak resin bed 20 is accomplished by opening valve 29 and introducing water into service vessel 10 through bottom located inlet 28. Water enters underdrain 11 through inlet 28 and is evenly distributed over the cross-sectional area of the resin by false bottom 14 and screened openings 15. The water passes upwardly through screened openings 15 and the layer of heavier strong resin 22, the weight of the upper resin bed 20 preventing the expansion of the lower resin bed 22. The only exit for water entering inlet 28 is through transfer pipe 34. Therefore, as water flows into this pipe, the portion of resin bed 20 located adjacent the inlet of the pipe is fluidized and washed into and through transfer pipe 34, pipe 32b and into the bottom of regenerating vessel 12.

As the resin is washed into transfer pipe 34 other resin from around the inlet moves to replace the resin previously removed and is itself fluidized and washed into the inlet of transfer pipe 34. As the transfer of resin proceeds, the top surface of resin bed 20 gradually drops until most of the resin has been removed and eventually the top surface of resin bed 20 will assume the angle of repose of the resin. When almost all of the resin is removed, much of the weight of resin pressing on the lower resin bed 22 is released so that resin bed 22 can expand slightly. This slight expansion carries the remaining amount of the upper resin bed up to the level of the inlet to transfer pipe 34 so that substantially all of weak resin 20 can be removed.

While the resins are being discharged from pipe 32b and into the bottom of regenerating vessel 12, it is necessary to keep the resin beads fluidized and in suspension to prevent them from accumulating over the opening of the pipe into the bottom of the regenerator. In this respect, while the resin is being transferred from the service vessel to the regenerating vessel, a stream of water is introduced into the bottom of the regenerator through a valved conduit 46. This keeps the resin bed fluidized and in suspension, any overflow rising to the top of the regenerator being discharged through a valved outlet 48 along with the water used to transfer the resins. In this manner, the bed of light resin beads is transferred from service vessel 10 through transfer pipes 34 and 32b and into the bottom of regenerator 12 where a resin bed 20', as shown in phantom in FIGURE 1, is formed.

With the bed of exhausted weak resin in vessel 12, and the bed of exhausted strong resin remaining in service vessel 10, it is possible to backwash each resin bed in order to remove suspended matter filtered from the water being treated by the resin bed and other fines, such as particles of resin beads which have broken. Backwashing of the weak resin bed in regenerator 12 is accomplished by opening valves 45 and 47 in lines 46 and 48 respectively to permit backwash water to enter the bottom and exit from the top of regenerator 12. Backwashing of the strong resin bed 22 in service vessel 10 is accomplished by opening valves 29 and 31 in lines 28 and 30 respectively to permit backwash water to enter the bottom and exit from the top of service vessel 10. After the backwashing has been completed the layer of exhausted strong resin 22 is transferred from the bottom of service vessel 10 to a position above the layer of weak resin 20' in the regenerator in the following manner.

With valve 37 in line 36 open, water introduced into service vessel 10 through inlet 28 can fluidize and wash the portion of resin bed 22 surrounding the inlet to pipe 32a into and through pipes 32a and 36 and into resin distributor grid 38. Resin which moves to replace the resin previously washed into pipe 32a is itself fluidized and washed into and through pipes 32a and 36 and into resin distributor grid 38 until all of the heavy resin has been removed from the service vessel. The overflow of transfer water is discharged through valved pipe 48. Outlets 40 of the distributor grid 38 discharge the resin evenly over the entire cross sectional area of the regenerator to form a bed of exhausted strong resin 22', indicated in phantom in FIGURE 1, which is located above and rests on the bed of the exhausted weak resin 20'. Without the distributor grid, the resin entering into the upper portion of regenerator 12 will merely remain as a stationary pile whose top surface assumes the normal angle of repose of the material in still water. If the upper resin bed 22' were lighter than the lower resin bed 20', then it would be possible to eliminate distributor grid 38 and level the upper resin bed by upflowing water through vessel 12. However, in the present case where the upper bed 22' is heavier than the lower bed, such an upflow would cause the beds to mix or even invert their positions since the heavier resin would tend to sink and displace the lighter resin.

With both beds 20' and 22' of exhausted resin now located in regenerator 12, a regenerant is introduced into the regenerator through valved pipe 42 and regenerant distributor grid 44. The regenerant flows downwardly first through the layer of exhausted strong ion exchange resin 22' and then the layer of exhausted weak ion exchange resin 20' and exits from the regenerator through a bottom located valved outlet 50.

Rinsing excess regenerant from the regenerated resin is accomplished by introducing any suitable rinsing liquid into the regenerator through a top located valved inlet 52. The rinse also flows downwardly first through the layer of regenerated strong resin 22' and then the layer of regenerated weak resin 20', and leaves the regenerator through valved outlet 50.

After regeneration and rinsing both resin beds are returned to the service vessel 10 in the following manner. Valves 45 and 33 in lines 46 and 32a, b respectively, are opened to permit the introduction of water into the bottom of the regenerator, which fluidizes and washes both resin beds through transfer pipe 32a, b and into the bottom of service vessel 10. As the resins are being introduced into the bottom of the service vessel, water also enters the service vessel through inlet 28 to prevent the resins from piling up and blocking the inlet of conduit 32a into the service vessel. The water overflow is discharged from the top of service vessel 10 through top located outlet 30.

During transfer from regenerator 12 through transfer pipes 32a, b and into service vessel 10 the regenerated weak and strong resins will become intermixed. Separation of the intermixed body of resin into two layers 20 and 22 is accomplished simply by backwashing the regenerated resins after the transfer. After backwashing is terminated the resins will settle to the bottom of service vessel 10 according to their densities which establishes the layer of light weak resin 20 above the layer of heavy strong resin 22.

Referring now to the embodiment shown in FIGURE 2, it should be apparent that the embodiment has structure that is similar to the structure of the embodiment shown in FIGURE 1. However, some of the internal structure of the vessels and the piping interconnecting the vessels as shown in FIGURE 2 varies somewhat from that shown in FIGURE 1. Therefore, when referring to FIGURE 2, like structure will be designated by like reference numerals with the letter A affixed. A further distinction between FIGURES 1 and 2 is the fact that in FIGURE 2 weak ion exchange resin bed 20A has a specific gravity which is greater than the strong ion exchange resin bed 22A as indicated by the shading of bed 22A. Moreover, in the embodiment shown in FIGURE 2, the transfer of resin is accomplished by using a downward flow of water to force the resin under pressure into collector grids. This method has the advantage of transferring the resin without fluidizing so that resin is transferred in its most concentrated form.

Referring now to the drawings, FIGURE 2 shows a service vessel 10A and a regenerating vessel 12A. Disposed within service vessel 10A is a resin distributor and collector grid 70, a resin distributor grid 72 and a resin collector grid 74. The resin collector and distributor grid 70 is located at the weak-strong resin interface which may be higher or lower than as shown depending upon the relative volumes of resin beds 20A and 22A. Resin distributor grid 72 is located in the upper portion of service vessel 10A above the bed of weak ion exchange resin 20A and resin collector grid 74 is located just above false bottom 14A.

Disposed within regenerator 12A is a resin distributor and collector grid 80 and a resin collector grid 82. Resin collector and distributor grid 80 is positioned within vessel 12A, so as to lie at the weak-strong resin interface when exhausted resins are transferred to the regenerator and collector grid 82 is located just above false bottom 16A. A first valved transfer pipe 76 extends between and connects resin collector and distributor grids 70 and 80, a second valved transfer pipe 78, extends between and connects resin distributor grid 72 and collector grid 82 and a third valved transfer pipe 84 connects collector grid 74 with the upper portion of regenerator 12A.

When resin beds 20A and 22A become exhausted to the point where regeneration is necessary, the flow of untreated water through the service vessel is stopped by closing valve 27A in outlet pipe 26A. However, inlet pipe 24A remains open and in addition valved pipe 76 is opened so that the pressure of the incoming water can force the concentrated exhausted weak resin into resin collector grid 70, through pipe 76 and into resin collector and distributor grid 80. The exhausted weak resin is discharged by collector and distributor grid 80 into the lower portion of regenerator 12A to form a bed of exhausted weak resin indicated in phantom at 20A'. Any excess water carried over into the regenerator is discharged through outlet 50A.

With the bed of exhausted strong resin 22A located in service vessel 10A and the bed of exhausted weak resin 20A' located in regenerator 12A, it is possible, if desired, to backwash each bed separately to remove suspended matter or other fines filtered from the liquid being treated by the resin beds. In this respect, valve 29A in pipe 28A and valve 45A in pipe 46A are opened to permit the introduction of backwash water into the lower portion of service vessel 10A and regenerator 12A respectively. The backwash water leaves service vessel 10A through valved pipe 30A and leaves regenerator 12A through valved pipe 48A.

After backwashing, the transfer of the exhausted strong resin bed 22A from the service vessel 10A to the regenerator 12A is accomplished by opening valve 83 in transfer pipe 84. With transfer pipe 84 opened, the pressure of water entering through inlet pipe 24A forces exhausted strong resin into and through collector grid 74 and pipe 84 and into the upper portion of regenerator 12A. As in the case with the embodiment of FIGURE 1, the resins being discharged from pipe 84 into regenerator 12A would remain as a stationary pile whose top surface assumes the normal angle of repose of the material in still water unless some steps are taken to level the resin. While it is possible to use another resin distributor grid at this point to distribute the resin evenly over the cross-sectional area of regenerator 12A, we have instead shown another method in which leveling is accomplished by opening valve 45A to permit backwash water to flow upwardly through the weak and then the strong resin beds to discharge through outlet 48A. The weak resin being heavier than the strong resin will remain in the lower portion of regenerator 12A while the lighter strong resin is leveled. Regeneration is then accomplished by introducing a regenerant into regenerating vessel 12A through pipe 42A and regenerant distributor 44A. The regenerant flows downwardly first through the bed of exhausted strong ion exchange resin 22A' and then through the bed of exhausted weak ion exchange resin 20A' and leaves the regenerator through outlet pipe 50A. After regeneration, the regenerated strong and weak resin beds are rinsed by introducing any suitable rinsing liquid into vessel 12A through line 52A, the rinsing liquid also discharging through outlet 50A. After regeneration and rinsing, the resin beds are returned to service vessel 10A in the following manner.

Valved pipes 52A and 76 are opened so that the pressure of water entering vessel 12A through pipe 52A can force the regenerated strong resin into resin distributor and collector grid 80 through transfer pipe 76 and into resin collector and distributor grid 70. Grid 70 then discharges the regenerated strong ion exchange resin into service vessel 10A, the strong ion exchange resins falling by gravity to re-establish an ion exchange bed 22A in the lower portion of vessel 10A. Valved transfer pipe 78 is then opened so that the pressure of water entering the vessel through pipe 52A can force the regenerated weak ion exchange resin into collector grid 82 through pipe 78 and into resin distributor grid 72. Grid 72 then discharges the resin into the vessel 10A, the heavier resins falling by gravity to re-establish a bed of weak ion exchange resins 20A, located above the bed of strong ion exchange resins 22A. With both resin beds transferred and re-established, the treating of water can being anew.

Thus, it will be appreciated that the present invention accomplishes its intended objects providing a method and apparatus for practicing the downflow operation and regeneration of ion exchangers which uses weak and strong ion exchange resin of differing densities in the same service vessel.

While we have described only two embodiments of our invention, it should be apparent that various modifications can be made therein without changing the scope of the invention as claimed. For example, it should be obvious to one skilled in the art to locate resin collector and distributor grids at the weak-strong resin interface of the embodiment shown in FIGURE 1. Furthermore, resin collector and distributor grids can be locted adjacent the false bottoms of both vessels shown in FIGURE 1 to facilitate the transfer of resin from one vessel to another. However, where downflow through the vessels is used to transfer the resins, as shown for example in FIGURE 2, collector grids adjacent the false bottoms of the vessels are a necessity. Moreover, it is within the skill of the art to make the slight structural and plumbing modifications necessary to reverse the functions of the service vessels and regenerators. In this respect FIGURE 1 is capable of showing an ion exchange apparatus wherein service vessel, now shown as regenerating vessel 12, would contain a heavy strong ion exchange resin located above the lighter weak ion exchange resin. In like respect, FIGURE 2 is capable of illustrating an ion exchange apparatus wherein a service vessel, now shown as regenerating vessel 12A would contain a light ion exchange resin located above a heavier ion exchange resin.

Moreover, if the weak resin, when exhausted, has a specific gravity which is greater than the exhausted strong resin, then either embodiment could be modified in a manner which would permit simultaneous transfer of both exhausted resins to the regenerator. The transferred exhausted resins could then be backwashed in the regenerator to separate the exhausted resins according to their densities, the lighter exhausted strong resin being located above the heavier exhausted strong resin.

Having described our invention in detail, what we claim as new is:

1. A method for operating and regenerating ion exchangers comprising the steps of:
   (a) passing a fluid to be treated downwardly through successive layers of weak and strong ion exchange resins of differing densities arranged in a single service vessel;
   (b) removing said resins to a regenerating vessel and arranging the resins therein in an order reversed from their order in said service vessel;
   (c) passing a regenerant downwardly through successive layers of said strong and weak ion exchange resins; and,
   (d) returning regenerated resins to said service vessel and arranging said resins therein in their original order.

2. A method as set forth in claim 1 in which said weak and strong ion exchange resins are arranged according to their densities in one of said vessels by backwashing.

3. A method as set forth in claim 1 in which first one then another of said weak and strong ion exchange resins are transferred from one of said vessels to another.

4. A method as set forth in claim 3 in which
   (a) removing said weak resin from said service vessel to said regenerating vessel is accomplished prior to removing said strong resin to said regenerating vessel; and
   (b) removing said strong resin from said regenerating vessel to said service vessel is accomplished prior to removing said weak resin to said service vessel.

5. A method as set forth in claim 3 further comprising the step of cleaning said weak and strong ion exchange resins by backwashing while one of said resins is in each of said vessels.

6. A method as set forth in claim 1 in which said removing step is accomplished by introducing a pressurizing fluid into the upper portion of said service vessel to force first one then the other of said resins out of said service vessel and into said regenerating vessel.

7. A method as set form in claim 1 in which said removing step is accomplished by introducing a fluidizing liquid into the lower portion of said regenerating vessel to wash first one and then the other of said resins from said service vessel to said regenerating vessel.

8. Ion exchange apparatus comprising:
   (a) a service vessel containing a layer of strong ion exchange resin in the lower portion thereof and a layer of weak ion exchange resin in the upper portion thereof, said resin layers having differing specific gravities and disposed in a face to face relationship, said vessel having a top located inlet and a bottom located outlet for passing a fluid to be treated downwardly first through said weak resin and then through said strong resin;
   (b) a regenerating vessel having top located inlet and a bottom located outlet for passing a regenerant through said regenerating vessel;
   (c) means extending between and connected to said service and regenerating vessels for transferring said upper layer of weak resin into the bottom portion of said regenerating vessel and for transferring said lower layer of strong resin into the upper portion of said regenerating vessel; and
   (d) means for transferring said weak and strong resins from said regenerating vessel to their original position in said service vessel.

9. Ion exchange apparatus as set forth in claim 8 in which said first mentioned means comprises:
   (a) a first valved conduit communicating with said service vessel above the weak-strong resin interface for discharging weak resin from said service vessel to the bottom of said regenerating vessel;

(b) a second valved conduit communicating with the bottom portion of said service vessel for discharging strong resin into the upper portion of said regenerating vessel; and (c) fluidizing means connected to said service vessel for washing said weak and strong resins through said first and second conduits respectively.

10. Ion exchange apparatus as set forth in claim 9 in which said valved conduits each have an end terminating in a grid member located within one of said vessels.

References Cited

UNITED STATES PATENTS

| 3,208,934 | 9/1965 | Kingsburg | 210—33 |
| 3,160,585 | 12/1964 | Emmett et al. | 210—30 X |

FOREIGN PATENTS

| 595,314 | 3/1960 | Canada. |

SAMIH N. ZAHARNA, *Primary Examiner.*